United States Patent [19]

Atzinger

[11] 3,891,922

[45] June 24, 1975

[54] PIVOTED ARMATURE INSTRUMENT FOR AN ELECTROMAGNETIC RECORDING SYSTEM

[75] Inventor: Wolfgang Atzinger, Munich, Germany

[73] Assignee: Fritz Schwarzer GmbH, Munich, Germany

[22] Filed: Feb. 14, 1974

[21] Appl. No.: 442,528

[30] Foreign Application Priority Data
Apr. 6, 1973 Germany............................ 2317749

[52] U.S. Cl. .......................... 324/151 R; 324/154 R
[51] Int. Cl. ............................. G01r 1/16; G01r 5/18
[58] Field of Search...................... 324/146, 151, 154

[56] References Cited
UNITED STATES PATENTS

| | | |
|---|---|---|
| 799,733 | 9/1905 | Hartmann...................... 324/154 R |
| 2,175,046 | 10/1939 | Warner.............................. 324/146 |
| 2,348,006 | 5/1944 | Arcy.................................. 324/146 |
| 2,356,608 | 8/1944 | O'Bryan...................... 324/154 R x |
| 2,394,724 | 2/1946 | Snorek............................. 324/151 R |
| 2,889,520 | 6/1959 | Chapman............................ 324/146 |
| 3,302,191 | 1/1967 | Ziegler............................ 324/146 X |
| 3,327,208 | 6/1967 | Allen ................................ 324/146 X |

FOREIGN PATENTS OR APPLICATIONS
514,349 1/1938 United Kingdom............. 324/151 A

*Primary Examiner*—Gerard R. Strecker
*Attorney, Agent, or Firm*—Joel Wall; William C. Nealon; H. R. Berkenstock, Jr.

[57] ABSTRACT

A pivoted armature instrument for an electromagnetic recording system. There is disclosed an electromagnetic device which utilizes interaction between permanent and current-induced magnetic fields to angularly displace a rotatable, magnetically permeable, armature. The angular displacement is a function of relative field strengths and directions. The device has utility as a galvanometer-pen motor in systems for recording electrical signals on moving chart paper, and has other utility as well.

7 Claims, 2 Drawing Figures

PATENTED JUN 24 1975

3,891,922

PIVOTED ARMATURE INSTRUMENT FOR AN ELECTROMAGNETIC RECORDING SYSTEM

BACKGROUND OF THE INVENTION

1. Field of the Invention

The present invention relates generally to an electromagnetic system for recording electrical signals. More particularly, the present invention relates to an electromagnetic galvanometer-pen positioning device, including a magnetically-permeable armature rotatable through a magnetic field generated by a ring-type control winding, for use with an electrical signal recording system.

2. Description of Prior Art

Chart paper recorders for recording electrical signals are well known in the electronics arts. A particular application for chart paper recorders is found in the medical field, where electrical signals which correspond to a patient's vital signs (EKG, breath rate, heart rate, blood pressure, etc.) are recorded. The achievable accuracy of these recording systems is limited by respective accuracy of each of the system's component parts, such as: non-linearity of amplifiers and other electronics, frequency response, non-linearity, hysteresis, etc. of galvanometer pen movements, chart paper motor drive speed variation, etc. Prior art devices operate with a rotating coil in a constant magnetic field, or with a rotary magnet in a variable coil-field. Also, a supplementary return spring is generally employed. These devices introduce error into the overall measurement and recording. The present invention relates to an improvement in the area of galvanometer pen movements and significantly increases the overall accuracy of the recording system by eliminating the shortcomings of the above-mentioned prior art designs.

In prior art electromagnetic measuring elements, or systems which are intended for recording measured values, special additional requirements are established beyond the otherwise regular requirements covering overall accuracy and frequency range involved in direct recorders because of unavoidable friction between recording indicator and registering paper, as well as upper frequency limit of mechanical transmission. In conjunction with greater structural strength and overall stability required of the prior art arrangement, this leads all together to increased consumption of energy and transformation of energy in the end-stage and recording system. Resultant losses in the recording system itself, as in magnetic reversal losses in the pivoted armature, amount to values which can no longer be disregarded.

Hence a task of the present invention is to overcome prior art problems by constructing a pivoted armature instrument for an electromagnetic recording system, where a sensitivity acceleration or increase and an extended transmission range can be achieved with the same energy consumption, while stray field losses and magnetic reversal losses of the soft iron armature are avoided as extensively as possible.

SUMMARY OF THE INVENTION

The present invention relates to an electromagnetic rotational positioning device. A magnetically permeable rotatable armature is rotatably controlled by the inter-action of two magnetic fields, one permanent and the other generated in response to the electrical signal to be recorded. The armature rotates in a manner to create a path of minimal reluctance to the resultant magnetic field passing therethrough. A pen is attached to the armature and scribes on moving chart paper (registration paper) in accordance with the input electrical signal.

Special advantages of the invention can further be seen in the fact that a return spring is not required, and that a very compact iron support structure or platform for the entire arrangement is possible, so that degree of efficiency and sensitivity can be increased. This also permits a reduction of dimensions and bulk of the armature, which makes possible, over a more accurate and secure bearing, a smaller surface tolerance of armature and magnetic pole surfaces. Thus, due to smaller gap separation, either a further increase of sensitivity or also, an extended range of transmission, with the same energy consumption is achieved. Finally, an appreciable spatial reduction can likewise be achieved, with comparable electrical data, in contrast to recording systems of other prior art constructions.

It is thus an object of the present invention to provide an improved electrical signal recording system.

It is another object of the present invention to provide an improved pen-positioning device for use with an electrical signal recording system.

Other objects and advantages of the present invention will become apparent to one having reasonable skill in the art after referring to the detailed descriptions of the appended drawings in which:

DESCRIPTION OF THE PREFERRED EMBODIMENTS

The present invention pertains to a pivoted armature instrument for an electromagnetic recording system, with a soft iron armature rotatable through the magnetic field of a ring-type control winding, around its axis.

In accordance with the present invention, in recesses of a laminated soft iron block consisting of four quadrants, two permanent magnets are so arranged opposite each other, in the direction of the center line of the steering control winding which is likewise arranged in a recess, that in conjunction with a change of the steering-control current, the magnetic flow on opposite-located pairs of unipolar rotating field poles polarized through the constant magnetic field, to which poles the opposite-located armature surfaces of the soft iron armature located in a central recess are oriented, is amplified or attenuated at adjacent rotating field poles, and in each instance by the same amount.

In such an arrangement, at least practically negligeable magnetic reversal occurs in the soft iron armature, if field intensity of the permanent field is appreciably greater in comparison to the steering-control field, corresponding to normal operational occurrence. The resultant overall flow does not change because of the lagging soft iron armature.

Figure 1:
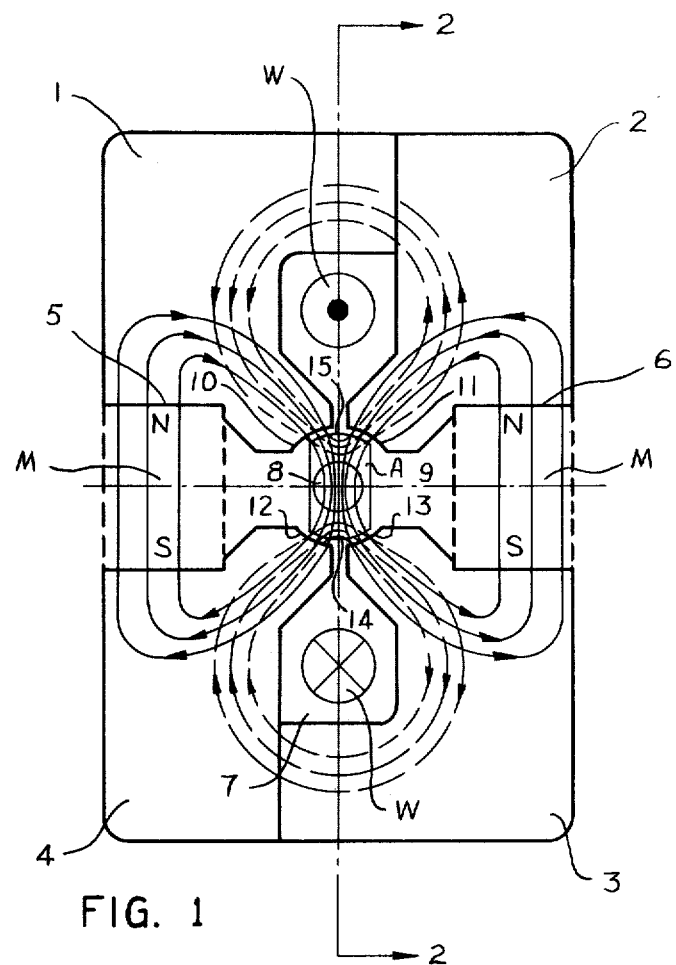
FIG. 1, depicts a schematic sectional view of an illustrative embodiment of the present invention including essential parts of a pivoted armature instrument.
Figure 2:
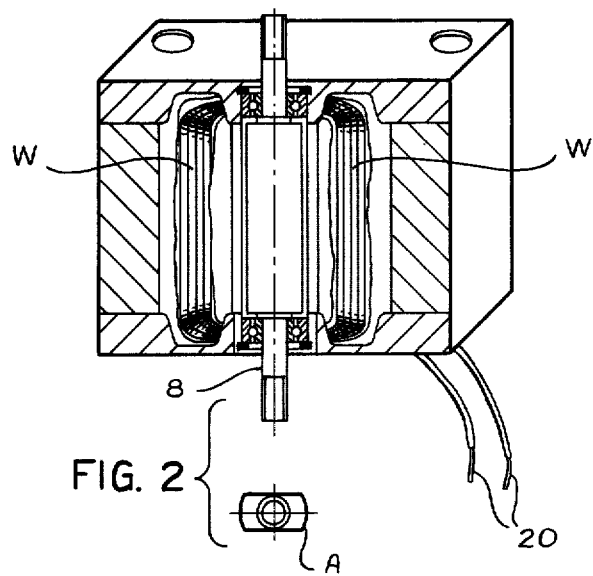
FIG. 2, depicts a sectional view in perspective of an exemplification of the pivoted armature instrument in FIG. 1.

Referring to FIGS. 1 and 2, the arrangement consists of a laminated soft iron block with four quadrants 1–4.

In the soft iron block, two opposite-located recesses 5, 6 are provided, in which permanent magnet M is arranged in each case. The steering-control winding W is arranged in recess 7, and rotatable (pivoted) soft iron or permeable armature 8, is arranged in a recess having a circular cross-section. Recess 9 represents an inner stray field space.

Permanent magnets M, in the exemplification shown, are arranged in such a manner that both upper rotating field poles 10, 11 are polarized unipolarly through the constant magnetic field, as well as both counter-located polarized rotating field poles 12, 13. Therefore, soft iron armature A, with armature surfaces 14 and 15, is located when there is essentially no steering current, in the position shown.

The following description is intended to more closely explain manner of operation of the exemplification depicted. In the figures, the variable magnetic field of the steering-control winding W is demonstrated in broken lines. Inasmuch as the variable field of the steering-control W is superimposed on the constant field of both of the magnets M, the field is amplified or increased between armature surface 15 and upper left rotating field pole 10, as is likewise the case with the field between lower right rotating field pole 13 and armature surface 14. On the other hand, the field between upper right rotating field pole 11 and armature surface 15, as well as the field between lower left rotating field pole 12 and armature surface 14 is attenuated by the same amount. As can be seen from the figure, the resultant overall flow remains unaltered by the lagging soft iron armature, because the steering-control winding changes the flow for instance between the armature surface 15 and the left upper rotating field pole 10 by the same amount in opposite direction, as between the armature surface and the right upper rotating field pole 11.

The arrangement and structuring of the recesses makes possible in the exemplification demonstrated, an almost complete embedding of the steering-control winding in iron, as can be seen especially from the preferred, practical form of exemplification according to the invention, as well as a more or less completely enclosed, extremely "stray-field-poor" iron conduction of the magnetic fields, whereby a high magnetic degree of efficiency and great insensitiveness to outside stray-fields is achieved.

Describing the operation of the present invention in somewhat different language, permanent magnets M create a (solid-lined) permanent magnetic field as shown in FIG. 1. This permanent magnetic field is depicted as passing from pole 10 through magnetically permeable rotatably mounted armature A and then through pole 12; and as passing from pole 11 through armature A and then through pole 13.

If winding or electrical conductor W had zero current passing therethrough, the dashed-line control magnetic field would likewise be zero. For this zero condition, armature A would be in a zero position as indicated in FIG. 1. But, the dashed-line magnetic field depicted is a result of current flow in winding W and armature A is caused to rotate for the following reasons.

The dashed-line magnetic field resulting from current flow in windings W combines with the solid-line permanent magnetic field in a reinforcing and cancelling manner. The reinforcement takes place at poles 10 and 13; the concomitant cancellation takes place at poles 11 and 12. Armature A being rotatably mounted is acted upon by this resultant magnetic field and for this example is made to rotate in a counter clockwise direction (FIG. 1) to a new rest or equilibrium position determined by the resultant or combined magnetic field. This armature position may be in accordance with a path of overall minimal magnetic reluctance to the resultant magnetic field. Similarly, if the direction of current flow in control winding W was reversed, then the angular displacement of armature A would be clockwise (FIG. 1).

It should be understood that motion of armature A can be transmitted to a galvanometer-pen stylus or scriber to register the amplitude and polarity of the control winding current on moving chart paper. Moving chart paper recorders and corresponding galvanometer pen devices are known in the prior art and hence are not shown nor described herein in detail. This, however, does not inhibit full understanding of the present invention.

It should be understood that although control winding W may be constructed from single conductor lead 20, it is arranged in winding W so that, as shown in FIG. 2, it has many effective parallel paths each of which contribute to the control magnetic field (dashed-lines). The portions of winding W which are effective in causing armature rotation are essentially parallel to the armature's axis of rotation, are imbedded in the soft iron laminated core or support structure, and are positioned on opposite sides of the armature near the boundary formed by the aperture.

The invention may be embodied in yet other specific forms without departing from the spirit or essential characteristics thereof. Thus, the present embodiments are to be considered in all respect as illustrative and not restrictive, the scope of the invention being indicated by the appended claims rather than by the foregoing description, and all changes which come within the meaning and range of equivalency of the claims are therefore intended to be embraced therein.

What is claimed is:

1. An electromagnetic rotational positioning device comprising a magnetically permeable support structure including a tubularly-shaped aperture, an unmagnetized but magnetically permeable armature rotatably mounted within said aperture, electrical conductor means disposed within said structure adjacent opposite boundaries of said aperture and substantially parallel to the axis of rotation of said armature, means for applying an electrical current to said electrical conductor means, said electrical conductor means being arranged to generate responsive to said current a control magnetic field permeating said armature in substantially the same directions at opposite sides of said rotatable mount and in directions orthogonal to said axis of rotation of said armature, and permanent magnet means disposed within said structure adjacent other opposite boundaries of said aperture for generating at least two permanent magnetic fields permeating said armature in substantially the same direction and in a direction orthogonal to said axis of rotation of said armature, said armature being arranged to rotate in response to interaction of said control magnetic field with said permanent magnetic fields.

2. A device as recited in claim 1 and wherein said tubularly-shaped aperture is a right circular cylinder.

3. A device as recited in claim 2 and wherein said armature has an approximately rectangular axial cross-section and an approximately rectangular radial cross-section.

4. A device as recited in claim 3 and wherein said conductor means includes a single conductor lead which is foldedly arranged to form an apparant plurality of effective parallel conductors said plurality concertedly generating said control magnetic field.

5. A device as recited in claim 4 and wherein said armature is capable of both clockwise and counter clockwise rotation as a function of direction of flow of said electrical current.

6. A device as recited in claim 5 and wherein rotational amplitude of said armature is a function of magnitude of said electrical current.

7. A device as recited in claim 1 and wherein said armature is positioned to assume a minimal magnetic reluctance path to the magnetic field resultant from said interaction.

* * * * *

UNITED STATES PATENT OFFICE
CERTIFICATE OF CORRECTION

PATENT NO. : 3,891,922
DATED : June 24, 1975
INVENTOR(S) : Wolfgang Atzinger

It is certified that error appears in the above-identified patent and that said Letters Patent are hereby corrected as shown below:

At line 30 under "Foreign Application Priority Data" the number of priority publication should be changed to --2,317,494--.

Signed and Sealed this seventeenth Day of February 1976

[SEAL]

Attest:

RUTH C. MASON
Attesting Officer

C. MARSHALL DANN
Commissioner of Patents and Trademarks